United States Patent [19]

Paal

[11] Patent Number: 4,695,984

[45] Date of Patent: Sep. 22, 1987

[54] METHOD FOR ESTABLISHING A SURFACE CONSISTENT CORRECTION FOR THE EFFECTS OF THE LOW VELOCITY LAYER IN SEISMIC DATA PROCESSING

[75] Inventor: Ernest F. Paal, Houston, Tex.

[73] Assignee: Exxon Production Research Company, Houston, Tex.

[21] Appl. No.: 685,522

[22] Filed: Dec. 24, 1984

[51] Int. Cl.$^4$ .............................................. G01V 1/36
[52] U.S. Cl. ...................................... 367/54; 367/36; 364/421
[58] Field of Search ............................ 367/36, 50, 54; 364/421

[56] References Cited

U.S. PATENT DOCUMENTS 4,498,157  2/1985  Morter et al. ........................ 367/50
4,577,298  3/1986  Hinkley ................................ 367/50
4,581,724  4/1986  Zachariadis ......................... 367/54

OTHER PUBLICATIONS

Bath, M.; "An Analysis of . . . Refraction Seismology", 12/78, pp. 155-169, Techtonaphysics, vol. 51, #3-4, Abst.
Hollingshead et al, "A Novel Method of . . . Refraction", 1979, pp. 1-36, 49th Ann., SEG Mtg., R-21, Abst.
Yokahura et al, "A Simple Method . . . Reflection Method", 1983, pp. 32-42, Butsuri-Tonko, vol. 36, #4, Abst.
Chun et al, "The First Arrival Time . . . Statics", 10/15/81, pp. 3801-3847, 51st Ann., SEG Mtg., S214, Abst.

Primary Examiner—Nelson Moskowitz
Attorney, Agent, or Firm—Richard F. Phillips

[57] ABSTRACT

A method useful in seismic data processing for correcting data for the effects of the low velocity layer. At least three sets of traces having common offsets are displayed as a function of centerpoint. From this, the first refraction arrival for each trace may be hand picked, this first refraction arrival representing a compressional wave refracted along the lower boundary of the low velocity layer. An equation is set up for each source-receiver pair in which the transit time of the first refraction arrival is a function of three independent factors: the source to receiver distance; a low velocity layer component for the source; and a low velocity layer component for the receiver. These equations are solved in a simultaneous, least squares fashion to yield surface consistent solutions to the low velocity layer component at each source and receiver location.

19 Claims, 2 Drawing Figures

METHOD FOR ESTABLISHING A SURFACE CONSISTENT CORRECTION FOR THE EFFECTS OF THE LOW VELOCITY LAYER IN SEISMIC DATA PROCESSING

TECHNICAL FIELD

The present invention relates generally to a method useful in correcting for the effects of the low velocity layer in the processing of seismic data. More specifically, the present invention concerns a method for using refracted first arrivals from several constant offset seismic data sets to calculate, in a surface consistent manner, one-way low velocity layer time corrections for each receiver and shot location in a seismic survey.

BACKGROUND OF THE INVENTION

Seismic exploration is one of the most powerful techniques for investigating the configuration of the rock strata beneath the earth's surface. The typical end product of a seismic survey is a map, termed a "seismic depth section", indicating the thickness and orientation of the various strata underlying that portion of the earth's surface from which the survey was conducted. By correlating the seismic depth section with other geologic information, such as data concerning surface outcroppings of various strata, wellbore cotings and logs, and previous seismic sections, surprisingly detailed information concerning the outermost several kilometers of the earth's crust can be developed. The predominant use of seismic exploration is in the search for subsurface structures favorable to the existence of oil and gas reservoirs.

Seismic reflection surveys, the most common type of seismic survey, are performed by initiating a shock wave at the earth's surface and monitoring at a plurality of surface locations the reflections of this disturbance from the underlying subterranean formations. These reflections occur from regions where there is a change in the acoustic impedance of the earth, generally the interface between adjacent strata. The devices used to monitor the reflections are termed geophones. The signal recorded by each geophone represents as a function of time the amplitude of the reflections detected by that geophone. To a good approximation, the reflections detected by each geophone occur from a point on each reflective surface located on a vertical line passing through the midpoint between the source and geophone. Thus, for every seismic disturbance ("shot"), each geophone records a signal ("trace") which represents features of the formations vertically beneath a known point on the surface of the earth.

In performing a seismic survey, a large number of geophones, usually between 48 and 1024, are positioned along the line of the survey. Accordingly, for each shot numerous traces are obtained. Each of the traces resulting from a single shot represents the reflections from the interfaces along a unique vertical line passing through the subterranean formations. At the time each trace is recorded, it is uniquely designated on the basis of source and detector position. In this manner, every trace is uniquely identified relative to all other traces. This information is later utilized in correcting and displaying the traces.

Following each shot the source is moved along the line of the survey and a second shot is made, yielding a new set of traces. Generally, the geophones are spaced equal distances apart and the movement of the source relative to the geophones is carefully established such that with the exception of one of the two end geophones, each source-detector centerpoint from the first shot corresponds to a source-detector centerpoint from the second shot. In the simplest type of seismic survey, this is accomplished by moving the source and detectors as a unit a distance equal to the geophone spacing following each shot. Continuing the survey in this manner, the numerous traces will each correspond to one of a smaller number of source-detector centerpoints. Thus, each centerpoint is represented by several traces. Traces having common centerpoints represent reflections occurring from the interfaces along a common line extending vertically downward from the centerpoint. Conducting the seismic survey such that each trace from a first shot corresponds to a trace from the next shot is termed common depth point surveying.

The traces obtained in performing the survey must be corrected prior to final display and analysis to compensate for various factors which impede direct comparison of the original traces. One of the most troublesome of these corrections involves compensating for the effects on the traces of an uppermost layer of the earth, typically 10–100 meters thick, termed the "low velocity layer" or "weathered layer." The velocity of seismic compressional waves (p-waves) through the low velocity layer is typically in the range of 500–1000 meters/second, while p-wave velocities in the strata below the low velocity layer are typically in excess of 1500 meters/second. Because the low velocity layer often differs greatly in thickness over relatively short horizontal distances, the transit time of a seismic wave through the low velocity layer can vary significantly over the line of a seismic survey. If not corrected for, this variation can significantly alter the observed configuration and depth of the underlying strata. For example, assuming horizontal bedding of the strata underlying the low velocity layer, a thin region in a low velocity layer of otherwise constant thickness can cause a portion of the horizontal strata to appear convex. Because even small variations in the calculated orientation of rock strata can have a major impact on decisions regarding the probability of oil and gas being found at a certain subterranean location, it is important that aberrations caused by the low velocity layer be determined with the greatest precision possible.

An early method of correcting for the effects of the low velocity layer is disclosed in U.S. Pat. No. 2,276,306, issued Mar. 17, 1942. In this technique, dynamite is used to initiate the seismic distrubance. Each dynamite charge is situated in the bottom of a hole drilled through the low velocity layer. A geophone situated near the mouth of the source hole records the vertical transit time through the low velocity layer at the same time a set of geophones spaced along the survey line records the reflections from the underlying strata. From the geophone located at the mouth of each source hole, the vertical transit time as a function of position along the line of the seismic survey is known. This permits the various traces recorded in the course of the survey to be corrected simply and accurately for the effects of the low velocity layer. In modern seismic exploration this method is rarely available since surface sources have largely replaced the use of subsurface sources due to the relatively great cost and environmental difficulties associated with the latter.

Another well known technique for establishing the effect of the low velocity layer on reflected seismic data is the intercept-time refraction method. In this method, for each shot the resulting traces are examined to determine the time required for the seismic wave to travel along a path from the source through the low velocity layer to the interface at the bottom of the low velocity layer along which it is refracted until received by the receivers. This refraction path is illustrated in FIG. 1. Because this is generally the fastest seismic path from source to receiver it is the first signal received by the receiver. For each source location, the refracted first arrivals are plotted for time as a function of source-receiver offset. A least squares fit is applied to the data to yield a straight line, the slope of which represents the refraction velocity $V_2$, and having a specific intercept time, $t_r$, corresponding to an offset distance of zero. By the application of Snell's law, it can be shown that the one-way vertical transit time through the weathered layer, $t_{LVL}$, is given by the equation $$t_{LVL} = t_r/2[1-(V_1/V_2)^2]^{\frac{1}{2}}$$

where $V_1$ = seismic P-wave velocity of low velocity layer

However, because the plot on which the intercept-time refraction method is based does not distinguish between the low velocity layer transit time at the source and the receiver, the vertical one-way transit time calculated from this method is an average of the two values. In modern seismic processing schemes the uncertainty introduced by this averaging in many instances represents a significant fraction of the total error in a stacked, corrected trace.

It would be desirable to provide a method of establishing static corrections for the low velocity layer in which the correction at each source location is independent of the low velocity layer at any receiver location and the correction at each receiver location is independent of the low velocity layer at any source location. It would be further desirable if this method of low velocity layer static correction did not require any special procedures or equipment in the field, depending only on that data normally acquired in the course of a common depth point p-wave seismic survey. It would be yet further desirable if this method yielded an absolute rather than relative correction for the low velocity layer.

SUMMARY OF THE INVENTION

A method is set forth which is useful in correcting for the effects of the low velocity layer in p-wave and s-wave reflection and refraction seismic surveys. In one aspect of the invention, three gathers are established, each having traces of a selected common offset. The traces of each gather are displayed as a function of common depth point location. From each gather the first break for the traces is determined, the first break representing the transit time for the p-wave travel path from source to receiver along the refraction interface at the bottom of the low velocity layer. For each trace having one of the three selected common offsets, an equation is developed relating the known transit time to the sum of three factors: (1) the source-receiver distance divided by the p-wave velocity at the refraction interface: (2) a source contribution to the travel time: and (3) a receiver contribution to the travel time. Each of these equations has two unknowns (factors 2 and 3), however at least one unknown of each equation is shared by two other equations, corresponding to the other offset distances. Thus, the unknowns are overdetermined and the equations can be solved through familiar computer implemented least squares simultaneous solution methods. In another embodiment of this invention, further improvement in determining the static correction for the low velocity layer is obtained by using at least one additional offset gather and solving for lateral changes in the refraction velocity.

BRIEF DESCRIPTION OF THE DRAWINGS

For a better understanding of the invention, reference may be had to the accompanying drawings, in which.

These drawings are not intended as a definition of the invention, but are provided solely for the purpose of illustrating certain aspects of the invention as described below.

BEST MODE OF PRACTICING THE INVENTION

The present invention concerns a method of processing seismic data to establish a surface consistent static correction for the effects of the low velocity layer. In the preferred embodiment, this method is applied to common depth point, multifold seismic data obtained from a roll-along reflection survey conducted along a substantially linear survey path. However, those skilled in the art will recognize that the present invention is applicable to the processing of data from many different types of seismic surveys. To the extent that the following description is specfic to roll-along reflection surveys, this is by way of illustration rather than limitation.

Figure 1:
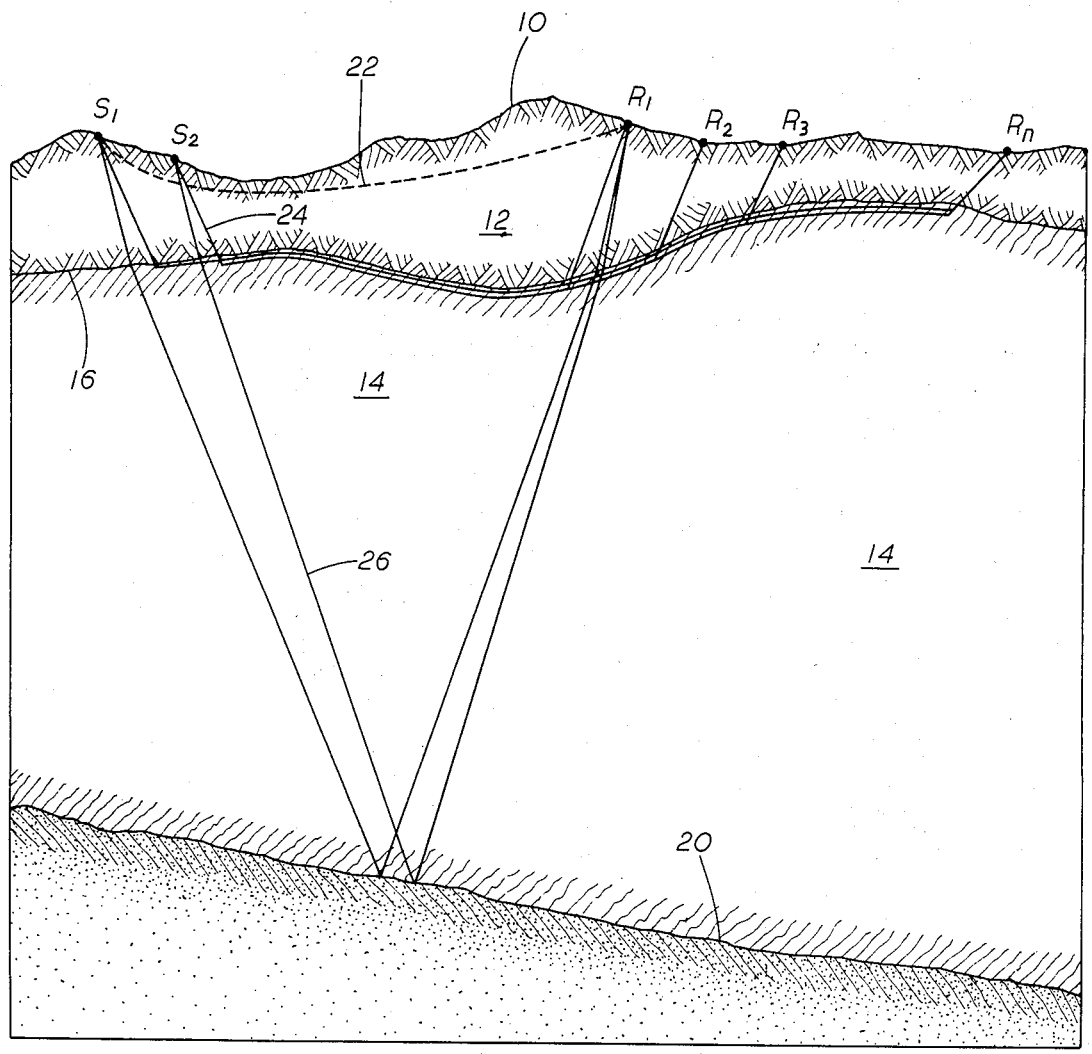
FIG. 1 illustrates the transmission of seismic signals from a pair of sources to a number of receiver locations by refraction along the lower boundary of the low velocity layer and reflection from a reflective interface beneath the low velocity layer.

FIG. 1 is a cross section of the earth's surface illustrating the transmission of a seismic signal in a typical seismic reflection survey. A seismic disturbance is introduced into the earth from each of a plurality of seismic source locations $S_1$, $S_2$, ... $S_n$ situated in a substantially linear array along the earth's surface 10. Immediately beneath the surface 10 is a weathered layer (low velocity layer) 12, and, beneath the weathered layer 12, an un-weathered layer (high velocity layer) 14. The boundary between the weathered and un-weathered layer 12, 14 defines a refraction interface 16. FIG. 1 illustrates that at a critical angle of incidence a seismic wave travelling downward through the weathered layer 12 will be refracted along the refraction interface 16 rather than transmitted into the un-weathered layer 14. This is illustrated in FIG. 1 by the two ray-paths 24 and 26 issuing from source $S_2$. A first ray-path 26 is incident to the refraction interface 16 at less than the critical angle and accordingly is transmitted into the un-weathered layer 14 to be reflected from the various deeper interfaces, including interface 20. A second ray-path 24 is incident to the refraction interface 16 at the critical angle and accordingly is refracted along the refraction interface 16 rather than being transmitted into the un-weathered layer 14. The critical angle, measured from a perpendicular to the refraction interface 16 at the point of incidence, is given by Snell's Law:

$$\theta_{critical} = \cos^{-1}[1-(V_1/V_2)^2]^{\frac{1}{2}} \qquad \text{equation 1}$$

where
- $V_1$ = seismic p-wave velocity in the weathered layer
- $V_2$ = seismic p-wave velocity in the un-weathered layer The critical angle for a typical low-velocity layer/high velocity layer interface is 25°.

Figure 2:
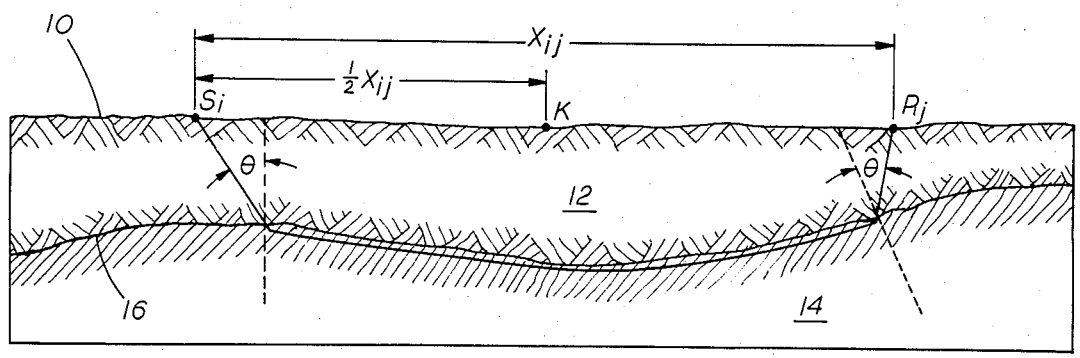
FIG. 2 illustrates the ray-path of a seismic signal along the lower boundary of the low velocity layer.

Seismic signals travelling to a detector along any path entirely within the weathered layer 12 (such a path being indicated by dashed line 22 in FIG. 1) are typically received after seismic signals transmitted along the somewhat longer path following the refraction interface 16. This is because the velocity through the weathered layer is typically 500–1000 meters/second, while that through the unweathered layer is generally in excess of 1500 meters/second. Thus, except for relatively short source-detector spacings, the increase in path length represented by transit of the signal to and from the refraction interface 16 is more than offset by the greater p-wave transmission velocity of the refraction interface 16. Accordingly, the first portion of the seismic signal to be detected (the "first break") by each receiver typically follows a path along the refraction interface 16, as shown in FIG. 2.

In a preferred embodiment of the present invention, the static correction for the low velocity layer is derived from solving an overdetermined set of simultaneous equations based on the p-wave transit time along the refraction interface 16. These equations are of the form:

$$T_{ij} = S_i + R_j + (X_{ij}/V_2) \qquad \text{equation 2}$$

where:
- $T_{ij}$ is the seismic p-wave transit time for travel via the refraction interface from a source located at i to a receiver located at j
- $S_i$ is the travel time contribution of the source
- $R_j$ is the travel time contribution of the receiver
- $X_{ij}$ is the distance between points i and j
- $V_2$ is the refraction velocity, which is also the seismic p-wave velocity of the strata immediately beneath the refraction interface.

Of course, $T_{ij}$ and $X_{ij}$ are known for each receiver pair. For the present embodiment, $V_2$ will be assumed constant at all points along the line of the survey. $V_2$ may be measured by means of a refraction survey or in other manners well known to those skilled in the art.

In the preferred practice of the method, three source-receiver offset distances are selected from the seismic multifold common depth point survey. As will become apparent subsequently, it is convenient, but not necessary to the practice of the present method that the selection of traces to be used in the present method be based on a common offset basis. For each of the selected offset distances a gather of all receiver traces as a function of source-detector centerpoint location is developed and displayed. From this gather the refracted first arrivals, representing $T_{ij}$ for each trace, may be visually determined. Following this, a set of simultaneous equations of the form of equation 2 is established for each trace included in any of the three sets of traces representing the three selected offset distances. Each of the equations contains only two unknowns, $S_i$ and $R_j$.

The set of simultaneous equations will contain common terms. $R_j$ is identical for all traces representing a source-receiver pairs having a common receiver location. This is because, as shown in FIG. 1, only the initial portion of the seismic signal path differs for seismic signals travelling from different sources to a common receiver. Similarly, $S_i$ is identical for all traces representing source-receiver pairs having a common source location. Further, where the seismic survey is conducted such that source locations coincide with receiver locations, to a good approximation $R_i$ will be equal to $S_j$ where $R_i$ and $S_j$ represent a common surface location.

The number of unknowns in the set of simultaneous equations developed from all traces representing the three selected offset distances is less than the number of independent equations. Accordingly, the simultaneous equations are overdetermined and all values of $S_i$ and $R_j$ can be established by a simultaneous, least square solution. The simultaneous least square solution for all values of $S_i$ and $R_j$ in the equations may be accomplished by computer implemented methods well familiar to those skilled in the art. Improved accuracy in the determination of the various $S_i$ and $R_j$ values may be obtained by increasing the number of offset values represented in the set of simultaneous equations. For the constant refraction velocity situation, it has been found that for seismic data of average quality, the best balancing of accuracy of result and efficient expenditure of computer time is met with the use of six offset distances.

After obtaining the travel time correction for each unique surface location represented in the survey, the one-way vertical transit time through the low velocity layer at each source or receiver location may be obtained by an equation of the form:

$$t_{LVL_i} = S_i / [1 - (V_1/V_2)^2]^{\frac{1}{2}} \qquad \text{equation 3}$$

This value for each surface location is used for the absolute static time correction for time sections. It is a simple matter to convert to the static depth correction for depth sections.

A significant benefit of the practice of the present invention is that the calculated transit times are surface consistent. That is, the low velocity layer transit time calculated for each receiver location is independent of the low velocity layer transit time for all source locations serving as the origin for all seismic signals received at such receiver location. Further, the present method yields an absolute, rather than relative low velocity layer static correction. This facilitates making time ties between intersecting seismic lines. An additional benefit is that there is no need to perform any special procedures in the course of the seismic survey. This method of performing the static correction for the low velocity layer requires no data additional to that obtained in a standard seismic survey.

A refinement of the present method allows lateral variations in the refraction velocity over the length of the survey to be taken into consideration. It is important to correct for such variations where present. If the lateral refraction velocity is wrongly assumed constant, the variations in the lateral velocity will be incorrectly translated into thickness variations in the low velocity layer. To account for these variations, equation 2 is modified to bring into account a variable refraction velocity component:

$$T_{ij} = S_i + R_j + (X_{ij}/V_k) \qquad \text{equation 4}$$

where $V_k$ is an unknown representing the average refraction velocity at location k for all source-receiver pairs having location k as their centerpoint. Thus, for a single set of common offset traces, each trace corresponds to a unique location k and, if $V_k$ is not constant, a unique refraction velocity $V_k$. Where there are multiple sets of traces, each set having a common offset, each location k and value $V_k$ for one set of common offset traces will correspond to one location k and value $V_k$ in each other set of common offset traces. To make the system of equations of the form of equation 4 overdetermined, four sets of common offset traces are required. However, for this variable refraction velocity situation, it has been found that the best balancing of accuracy of result and efficient expenditure of computer time is met with the use of ten offset distances. In performing this method, it is preferred that the offsets selected be symmetrical on both sides of a split-spread profile. This minimizes dip effects on the refraction velocity $V_k$.

After the least-square solution $$t_{LVLi} = S_i/[1-(V_1/V_k)^2]^{\frac{1}{2}}.$$

The best known mode of practicing the present invention has been described above. However, it is to be understood that this description is illustrative only and that other means and techniques can be employed without departing from the scope of the invention as set forth in the appended claims.

What is claimed is:

1. A method for correcting multifold seismic data for the effects of the low-velocity layer, comprising the steps of:
   (a) selecting at least three sets of seismic traces from said seismic data, the traces within each of said seismic trace sets having a common offset;
   (b) determining for each trace within said seismic trace sets the source to receiver transit time for that seismic signal path corresponding to refraction along the lower boundary of the low-velocity layer;
   (c) establishing for each trace within said seismic trace sets an equation of the form $$T_{ij} = S_i + R_j + T_1 \; PS$$
   where
   $T_{ij}$ = source to receiver transit time along the refraction interface at the lower boundary of the low-velocity layer
   $S_i$ = time contribution due to source at location i
   $R_j$ = time contribution due to receiver at location j
   $T_1$ = transit time for seismic wave travel a preselected distance along the lower boundary of the low velocity layer; and
   (d) solving the equations established in step c;
   (e) applying the values $S_i$ and $R_j$ to correct said multifold seismic data for the effects of the low velocity layer; and,
   (f) displaying the corrected multifold seismic data.

2. The method as set forth in claim 1, wherein $$Thd \; 1 = X_{ij}/V_2$$
   where
   $X_{ij}$ = distance from the source to receiver
   $V_2$ = a uniform refraction velocity 3. The method as set forth in claim 1, wherein step d includes performing a simultaneous least squares solution for the values of $S_i$ and $R_j$ at each source and receiver location i and j.

4. The method as set as set forth in claim 1, wherein step (e) involves converting the low velocity layer time contribution due to each source and receiver location into a low velocity layer thickness for each such source and receiver location.

5. The method as set forth in claim 1, wherin at least four sets of seismic traces are used, each set having a different common offset value and wherein $$T_1 = X_{ij}/V_k$$

where $V_k$ is an unknown representing the average refraction velocity at location k for all source-receiver pairs included in said selected sets of traces having location k as their centerpoint.

6. The method as set forth in claim 5, wherein the selected sets of seismic traces are symmetrically disposed on both sides of a split-spread profile.

7. A method for establishing the low-velocity layer static correction for multifold seismic data, comprising the steps of:
   (a) selecting from the data resulting from a seismic survey a set of traces representing a series of common depth point locations along the line of the seismic survey, the selected set of traces representing a total number of individual source and receiver locations which is less than the total number of selected traces;
   (b) determining for each trace within said selected set of traces the source to receiver transit time for the p-wave signal path corresponding to refraction along the lower boundary of the low-velocity layer;
   (c) establishing for each trace within said selected set of traces an equation of the form $$T_{ij} = S_i + R_j + (X_{ij}/V_2)$$

where
   $T_{ij}$ = source to receiver transit time along the refraction interface at the lower boundary of the low-velocity layer
   $S_i$ = time contribution due to source at location i
   $R_j$ = time contribution due to receiver at location j
   $X_{ij}$ = distance from the source to the receiver
   $V_2$ = a uniform refraction velocity along the lower surface of the low velocity layer;
   (d) solving the set of simultaneous equations established in step c for each unique receiver and source location i and j;
   (e) applying the values $S_i$ and $R_j$ to correct said multifold seismic data for the effects of the low velocity layer; and,
   (f) displaying the corrected multifold seismic data.

8. The method as set forth in claim 7, wherein the selected set of traces represents all traces from the seismic survey having an offset equal to one of at least three selected offset values.

9. The method at set forth in claim 7, wherein $V_2 = V_k$, $V_k$ being an unknown representing the average refraction velocity at location k for all source-receiver pairs within said selected set of traces having location k as their centerpoint.

10. The method as set forth in claim 7, wherein step (e) includes converting the low-velocity layer time contribution due to each source and receiver location into a vertical p-wave low-velocity layer transit time for each unique source and receiver location represented within said selected set of traces.

11. A method for establishing a seismic section corrected for the effects of the low velocity layer, comprising the steps of:

initiating a plurality of seismic disturbances at spaced source locations along the surface of the formation;

recording a record for each seismic disturbance at a plurality of spaced receiver locations along the surface of the formation;

determining for each trace corresponding to a plurality of selected source-receiver pairs the source to receiver transit time for a p-wave signal refracted along the lower interface of the low-velocity layer; and, solving for the equation $T_{ij}=S_i+R_j+(X_{ij}/V_2)$ for said selected source-receiver pairs where $T_{ij}$=source to receiver transit time along the refraction interface at the lower boundary of the low-velocity layer $S_i$=time contribution due to source at location i $R_j$=time contribution due to receiver at location j $X_{ij}$=distance from the source to receiver $V_2$=refraction velocity along the interface at the lower boundary of the low-velocity layer wherein the total number of selected source-receiver pairs, each being the basis of a unique equation of the form given above, is greater than the total number of independent source and receiver locations represented by said source-receiver pairs; and, applying the values $S_i$ and $R_j$ to correct said each trace for the effects of the low velocity layer.

12. The method as set forth in claim 11, wherein the selected source-receiver pairs each correspond to one of a selected plurality of offset distances.

13. The method as set forth in claim 11, wherein at least some of said source locations and receiver locations represent a common position along the surface of the formation.

14. The method as set forth in claim 11, wherein the refraction velocity $V_2$ is assumed constant.

15. The method as set forth in claim 14, wherein the refraction velocity $V_2$ is $V_k$, an additional unknown representing the average refraction velocity at location k for all source-receiver pairs having location k as their centerpoint and wherein the total number of selected source-receiver pairs, each being the basis of a unique equation of the form given in claim 11, is greater than the sum of the total number of independent source and receiver locations and the total number of independent values of $V_k$.

16. A method for correcting multifold seismic data for the effects of the low-velocity layer, comprising the steps of:

(a) selecting at least three sets of seismic traces from said seismic data, the traces within each of said seismic trace sets having a common offset;

(b) determining for each trace within said seismic trace sets the source to receiver transit time for that seismic signal path corresponding to refraction along the lower boundary of the low-velocity layer;

(c) establishing for each trace within said seismic trace sets an equation of the form $$T_{ij}=S_i+R_j+(X_{ij}/V_k)$$

where $T_{ij}$=source to receiver transit time along the refraction interface at the lower boundary of the low-velocity layer $S_i$=time contribution due to source at location i $R_j$=time contribution due to receiver at location j $T_i$=transit time for seismic wave travel a preselected distance along the lower boundary of the low velocity layer;

$X_{ij}$=distance from the source to the receiver $V_k$=an unknown representing the average refraction velocity at location k for all source-receiver pairs included in said set of traces having location k as their centerpoint; and (d) solving the equations established in step c for the unique receiver and source locations i and j and for the unique centerpoint locations k;

(e) applying the values $S_i$ and $R_j$ to correct said multifold seismic data for the effects of the low velocity layer; and, (f) displaying the corrected multifold seismic data.

17. The method as set forth in claim 16, wherein step d includes performing a simultaneous least squares solution for the values of $S_i$, $R_j$ and $V_k$ for each unique source and receiver location i and j, and for each unique centerpoint location k.

18. The method as set forth in claim 16, in which step e involves converting the low velocity layer time contribution due to each source and receiver location into a low velocity layer thickness for each such source and receiver location.

19. The method as set forth in claim 16, wherein the selected sets of seismic traces are substantially symmetrically disposed on both sides of a split-spread profile.

* * * * *